United States Patent [19]

Sieurin

[11] 3,851,556
[45] Dec. 3, 1974

[54] SHEARING APPARATUS
[75] Inventor: Donald Sieurin, Northboro, Mass.
[73] Assignee: Morgan Construction Company, Worcester, Mass.
[22] Filed: Mar. 19, 1974
[21] Appl. No.: 452,664

[52] U.S. Cl. .................... 83/311, 83/306, 83/312, 83/343
[51] Int. Cl. .................... B23d 19/04, B26d 7/06
[58] Field of Search ............ 83/311, 312, 343, 344, 83/306

[56] References Cited
UNITED STATES PATENTS
2,621,734   12/1952   Morgan et al. ..................... 83/306
3,590,676   7/1971    Fritz................................. 83/311
3,727,498   4/1973    Poran............................... 83/343 X Primary Examiner—Willie G. Abercrombie
Attorney, Agent, or Firm—Thompson, Birch, Gauthier & Samuels

[57] ABSTRACT

An apparatus for subdividing an axially moving product length is disclosed. The apparatus includes a pair of shear blades mounted on opposite sides of the path travelled by the product length. The shear blades are rotatable about non-parallel axes, and are arranged to effect a cutting action on the product length. The cutting action occurs along a reference line which intersects the path of product travel and which also bisects the angle included between the rotational axes of the cutting blades. The shear blades are driven continuously by a variable speed drive which is adjustable to equate the peripheral speed of the blade portions cutting the product with the linear speed of the product. The lengths of the resulting subdivided product sections can thus be varied by shifting the point at which the path of product travel intersects the aforesaid reference line and by making a suitable adjustment to the rotational speed of the shear blades.

8 Claims, 4 Drawing Figures

SHEARING APPARATUS

DESCRIPTION OF THE INVENTION

This invention relates generally to the art of cutting or shearing, and is concerned in particular with a novel and improved apparatus for subdividing elongated axially moving product lengths. The invention is especially suited for, although not limited in use to, the subdivision of hot rolled products such as bars and the like issuing from a rolling mill.

In a conventional bar mill installation, the hot rolled bars are received from the mill on a run-on table and are directed thereon through a conventional stop-start dividing shear to a cooling bed. The stop-start dividing shear cuts the bars into shorter sections which are laterally shifted onto the cooling bed, where they are cooled while being transferred laterally thereacross. At the delivery side of the cooling bed, the bar sections are received on a run-off table which conveys the cooled bar sections in batches to other shears where the bar sections are finally cut into shorter customer lengths which are then packaged for shipment.

The minimun length of the bar sections being received on the cooling bed depends upon the delivery speed of the mill equated against the minimun sequel time of the stop-start shear. For example, with a mill delivery speed of 50 feet per second and a shear sequel time of 4 seconds, the minimum bar section that can be cut is 200 feet. Thus, the cooling beds and associated roller tables required to handle such bar sections must be comparably sized, and this in turn necessitates substantial capital investments for equipment and buildings.

One of the objects of the present invention is the provision of a shearing apparatus which may be employed at the delivery end of the mill to immediately subdivide the product issuing therefrom into customer lengths on the order of, for example, 10 to 60 feet. Under many circumstance, this makes possible material reductions in the required lengths of subsequent handling equipment, particularly the cooling bed, which is one of the more expensive pieces of equipment in a bar mill installation.

Another problem with conventional bar mill installations of the type described above stems from the fact that there is frequently a temperature differential of around 300°F between the first and last bar sections in any given batch being subdivided by the shears following the cooling bed. Although at the time of shearing, the bar sections are accurately subdivided, for example, to 60 foot customer lengths, the temperature differential existing at the time of shearing can ultimately produce a 1-1½ inch difference in length between certain of the subdivided sections after they have all finished cooling to ambient temperature. It is a further object of the present invention to obviate this problem by subdividing the bars into shorter customer lengths as they issue from the mill at relatively constant rolling temperatures, and before the bars have had an opportunity to cool to differing temperatures on the cooling bed.

Another object of the present invention is the provision of a shearing apparatus of the above-described type which may be rapidly and efficiently adjusted to vary the lengths of the subdivided sections, thereby enabling a mill owner to easily satisfy differing customer requirements.

These and other objects and advantages of the present invention will become more apparent as the description proceeds with the aid of the accompanying drawings, wherein.

Figure 1:
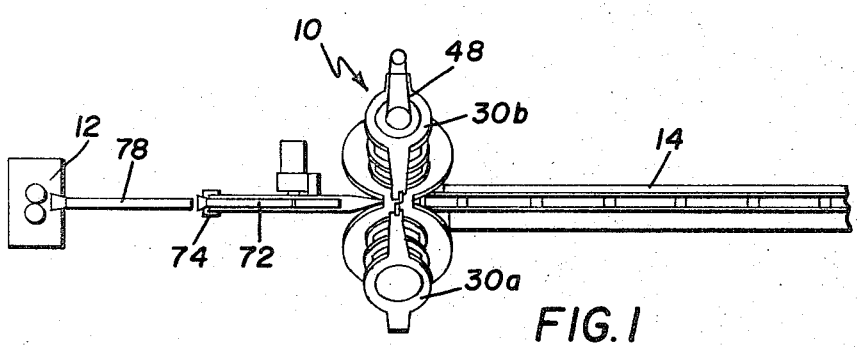
FIG. 1 is a somewhat schematic plan view on a reduced scale, with portions omitted, showing a shear embodying the concepts of the present invention located between the last stand of a rolling mill and a conventional run-on table.

Referring now to the drawings wherein like numbers designate like parts throughout the several views, there is generally indicated at 10 a shearing apparatus which as is best shown in FIG. 1, may typically be located in a rolling mill between the last roll stand 12 and a conventional run-on table 14. Although not shown, it will be understood that the run-on table 14 leads to a cooling bed which is employed to cool the hot rolled mill products.

The shear 10 includes a platform 16 supported on a pair of screw jacks 18, the latter being in turn supported on the mill floor 20. The screw jacks are interconnected by an intermediate drive shaft 22 and are driven by a common drive which includes a reversible motor 24 and a gear reducer 26.

The platform 16 supports a pair of non-parallel shafts 28 located on opposite sides of the path P travelled by a product length emerging from the last roll stand 12 of the mill. The shafts 28 have blade assemblies 30a and 30b rotatably mounted thereon. Each blade assembly includes an inner sleeve 32 which is journalled at opposite ends as at 34 and 36 for rotation on its respective shaft 28. The lower ends of the sleeves 32 are provided with gears 38 which intermesh as at 40. The gears 38 are enclosed by a lower housing 42 which is mounted on the platform 16. Blade carriers 44 surround the inner sleeves 32 and are rotatable therewith. Each blade carrier has an arm 44a to which is removably attached a shear blade 45, and an oppositely disposed counterweight section 44b. The cutting edges of the shear blades 45 are arranged to effect a cut along a reference line L which passes through the path P of product travel, and which also bisects the angle $\alpha$ included between the rotational axes A of the blade assemblies 30a and 30 b. Preferably, the cutting edges of the shear blades 45 are recessed at opposite locations to provide spaces, for example those shown at $S_1$ and $S_2$ in FIG. 4, when the blades are in their cutting positions. The purpose of these spaces will be described hereinafter.

Figure 3:
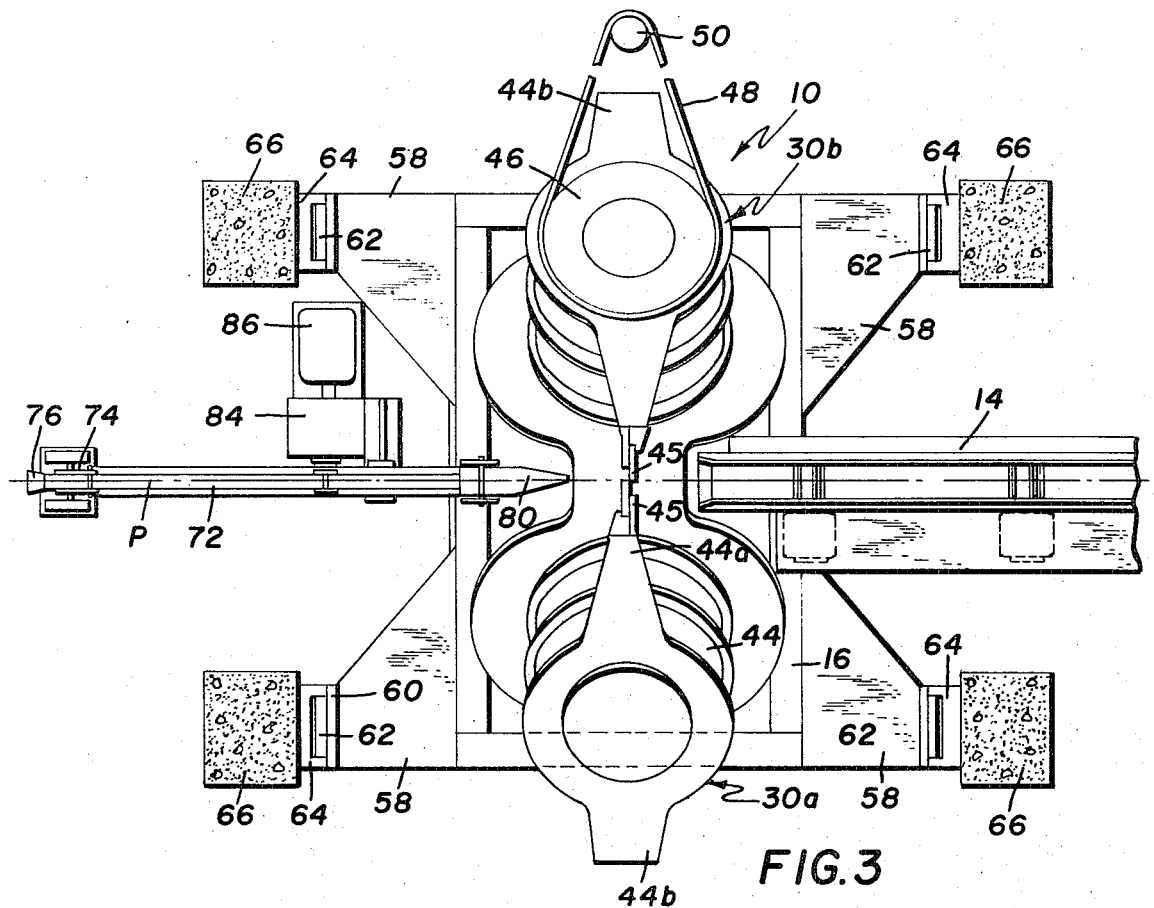
FIG. 3 is a plan view of the shear.
Figure 4:
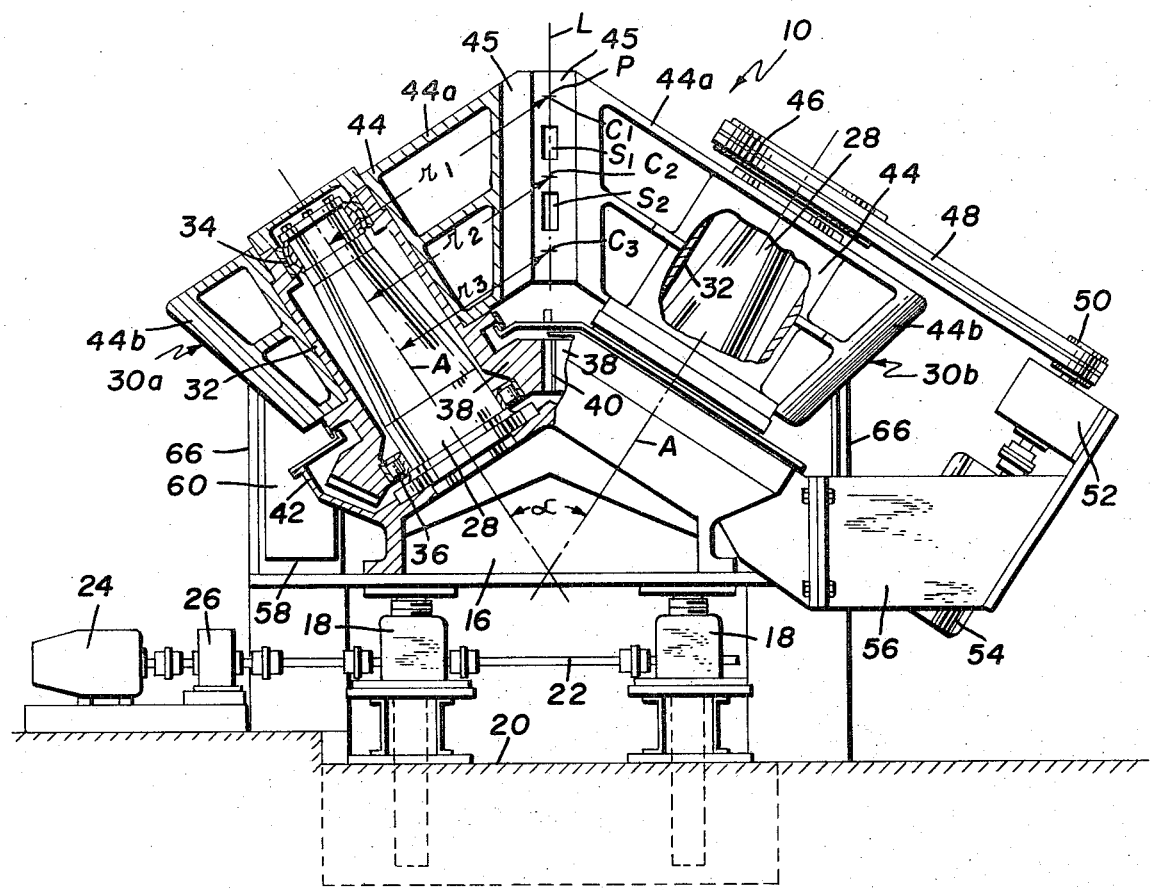
FIG. 4 is an end view of the shear with portions broken away, and with the apparatus adjusted to cut 60 foot lengths.

The blade carrier 44 of blade assembly 30b is further provided with a driven pulley 46 which is connected by means of a belt 48 to a drive pulley 50 on the output shaft of a gear reducer 52. The gear reducer 52 is driven by a variable speed motor 54, and both the motor and gear reducer are mounted on a bracket assembly 56 extending laterally from the lower housing 42. It will thus be seen that the variable speed motor 54 operates through gear reducer 52 and the belt 48 and its associated pulleys to rotate the blade assemblies 30a and 30b, the latter being mechanically interconnected by gears 38. Each time the blade assemblies rotate through 360°, the blades 45 cooperate as shown in FIGS. 3 and 4 to affectuate a cut on product travelling along path P.

The platform 16 is further provided with forwardly and rearwardly extending feet 58 which have shoes 62 at their upturned outer ends 60. The shoes 62 are slidably received in vertical guide channels 64 affixed to support posts 66. The guiding action provided by the cooperative sliding engagement of the shoes 62 in the channels 64 supports the platform 16 when the latter is being vertically displaced by the screw jacks 18 towards and away from the path P. This movement occurs in opposite directions parallel to the reference line L.

A guide pipe 72 is employed on the upstream side of the shear. The pipe is pivotally supported at is upstream end as at 74 and is provided with a bell mouth 76 for axially receiving the mill product from an intermediate delivery pipe 78 leading from the last roll stand 12 of the mill. The guide pipe 72 defines the path P, and it is supported at a location adjacent to its delivery end 80 on a rotatable eccentric 82. The eccentric is driven through a gear reducer 84 by a motor 86. By rotatably adjusting the eccentric 82, the delivery end 80 of the guide pipe 72 and hence the path P along which product is exiting therefrom, will undergo vertical adjustment along reference line L as viewed in FIG. 4.

The operation of the invention will now be described in connection with a typical rolling mill installation where bar products are being rolled at a mill delivery speed of 3,000 f.p.m., and where it is desired to provide the customer with shorter sections of either 60, 40, 30, 20, or 10 feet in length. As shown in FIG. 4, the shear is set up to subdivide the product into sections which may be either 30 or 60 feet in length depending on the adjustment of guide pipe 72. More particularly, and with reference to FIG. 4, it will be observed that the screw jacks 18 have been adjusted to position the cutting points $c_1$ of the blades 45 in vertical alignment with the path P of product travel. The radius $r_1$ of each cutting point $c_1$ in relation to its rotational axis A is such that the circumference of the circular path travelled by the cutting point $c_1$ is 30 feet. The motor 54 is adjusted to rotate the blade assemblies 30a and 30b at a speed of 100 R.P.M. Hence, the cutting points $c_1$ are rotating at the same speed as the linear speed of the product (3,000 f.p.m.), and thus the subdivided sections produced by each rotation of the blade assemblies will each equal 30 feet in length. Now, if it is desired to subdivide the product into sections which are 60 rather than 30 feet in length, the relative adjustments of the screw jacks 18 and the motor 54 need not be changed. Instead, each cutting action is followed by a "skip" where no cut is performed on the product. This is accomplished by momentarily dropping the path P of product travel along reference line L so that it is in alignment with the space $S_1$ at the instant when the shear blades are in their cutting position. This adjustment is performed by rotating the eccentric 82 in timed relation with the rotation of blade assemblies 30a and 30b so that the guide pipe 72 is pivoted about its upstream pivot 74. Thus it will be seen that with the shear adjusted as shown in the drawings and with the blade assemblies rotating at 100 R.P.M., 30 foot customer lengths can be produced by allowing the path P of product travel to remain in alignment with cutting points $c_1$ on reference line L, or in the alternative, 60 foot customer lengths can be produced by simply pivotally adjusting the guide pipe 72 in the above described manner.

Figure 2:
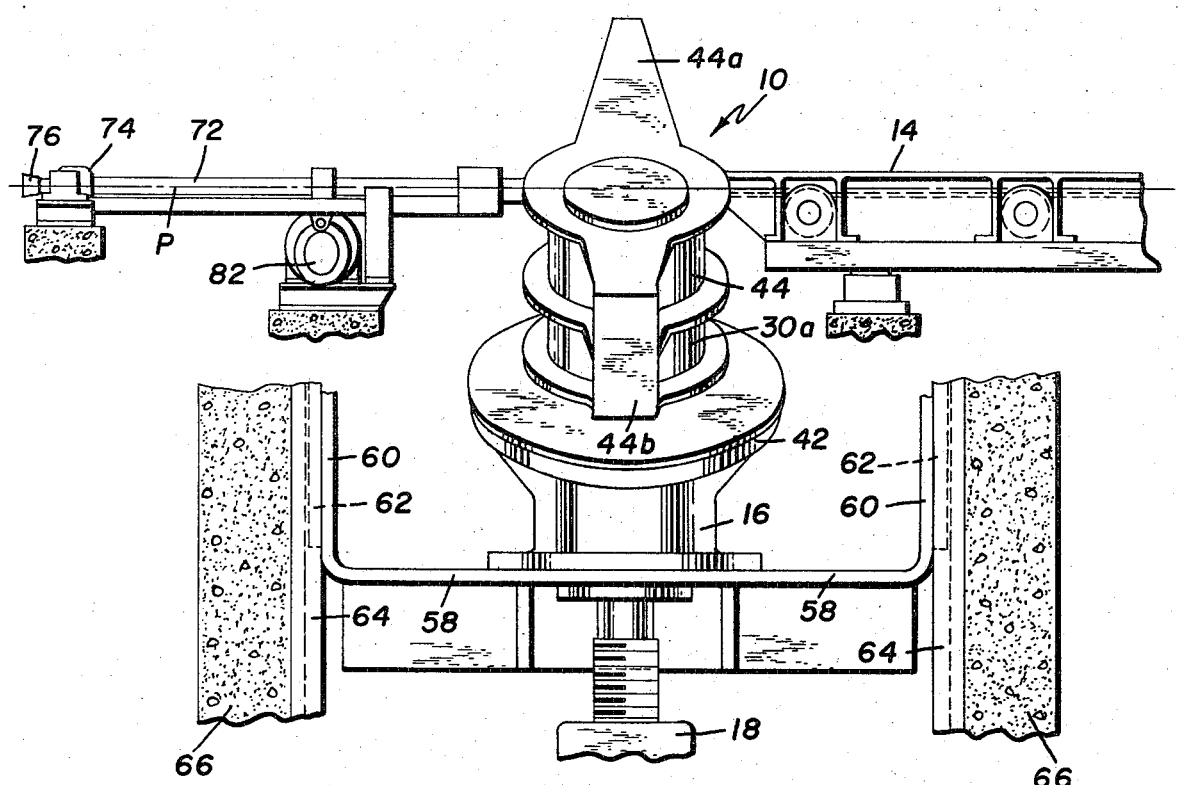
FIG. 2 is view in side elevation on an enlarged scale of the shear with the apparatus adjusted to cut 20 foot lengths.

If it is desired to subdivide the mill product into either 20 foot or 40 foot customer lengths, the following adjustments are made: the screw jacks 18 are employed to raise the platform 16 and the components supported thereon until the cutting points $c_2$ of the blades 45 are in alignment with the path P as shown in FIG. 2. The radius $r_2$ of each cutting point $c_2$ is such that these cutting points travel a circular path having a circumference of 20 feet. Accordingly, the motor 54 is adjusted to increase the rotational speed of the blade assemblies 30a and 30b to 150 R.P.M., thereby again equating the rotational speed of the cutting points $c_2$ with that of the linear speed of the product (3,000 F.P.M.). When thus adjusted, the shear will operate to subdivide the product into 20 foot lengths. If 40 foot lengths are required, every other cut is skipped by rotating eccentric 82 to momentarily drop the path P into alignment with space $S_2$, again without making any further adjustment to the screw jacks 18 or motor 54.

If 10 foot customer lengths are required, the screw jacks 18 are again adjusted to align cutting points $c_3$ with the path P. The radius $r_3$ of each cutting point $c_3$ is such that these cutting points travel a circular path whose circumference is 10 feet, and hence the motor is adjusted to further increase the rotational speed of the blade assemblies 30a and 30b to 300 R.P.M.

In light of the foregoing, it will now be appreciated by those skilled in the art that the present invention is readily adaptable to a wide range of mill speeds and customer requirements. Other customer lengths than those described above can be achieved by modifying the design of the blades 45 and the positioning and/or number of the recesses in the cutting edges thereof. The blade cutting edges can either travel truncated conical paths which are tangent to one another along the reference line L as shown in the drawings, or if desired the blades can overlap slightly to produce a lateral shifting of each newly created leading end when a cutting action is performed.

It is my intention to cover these and any other changes or modifications to the embodiment herein disclosed which do not depart from the spirit and scope of the invention.

I claim:

1. An apparatus for subdividing an axially moving elongated product into a plurality of equal length sections, comprising: a pair of cutting blades mounted on opposite sides of the path travelled by the product, said cutting blades being rotatable about non-parallel axes and being arranged to effect a cutting action on the product passing therebetween, the said cutting action occurring along a reference line which intersects said path and which bisects the angle included between said axes; and drive means for rotating said cutting blades about said axes, said drive means being adjustable to equate the peripheral speed of the blade portions cutting the product with the linear speed of the product, whereupon the length of the resulting subdivided sections will vary depending upon where said path intersects the said reference line.

2. The apparatus as claimed in claim 1 further characterized by said cutting blades circumscribing truncated conical paths about their respective rotational axes.

3. The apparatus as claimed in claim 1 further characterized by said cutting blades and said drive means being mounted on platform means located laterally with respect to said path, and adjustment means for moving said platform means towards and away from said path in a direction parallel to said reference line.

4. The combination as claimed in claim 1 further characterized by guide means for delivering the product along said path to said apparatus, and means for adjusting said guide means to move the position of said path along said reference line.

5. The apparatus as claimed in claim 1 wherein said cutting blades and said drive means are carried on a common platform means, and wherein said drive means includes a pinion gear fixed in relation to and rotatable with each of said cutting blades, said pinion gears being in intermeshed relationship, and a variable speed motor carried on said platform means and operatively connected to one of said cutting blades.

6. The apparatus as claimed in claim 4 wherein said guide means is comprised of a pipe having a receiving end and a delivery end, means at said receiving end for pivotally supporting said pipe, said adjustment comprising a rotatable eccentric supporting said pipe at a location adjacent to the delivery end thereof.

7. The apparatus as claimed in claim 1 further characterized by each of said cutting blades being recessed at spaced locations to provide areas along said reference line through which the product length may be directed between said cutting blades without being cut.

8. Apparatus for subdividing a product length moving axially along a path, comprising: platform means adjacent to said path; a pair of cutting blades mounted on said platform means for rotation about axes which intersect at a point located laterally with respect to said path, said cutting blades being operative during rotation thereof to effect a cutting action along a reference line passing through both said path and said point; variable speed drive means for rotating said cutting blades about said axes; first adjustment means for moving said platform means in opposite directions parallel to said reference line; guide means on one side of said platform means for directing the product length along said path to said apparatus, and second adjustment means for moving the delivery end of said guide means in opposite directions along said line.

* * * * *